W. E. ELLIOTT.

BUTTON FOR SHOES.

APPLICATION FILED OCT. 1, 1917.

Reissued Apr. 23, 1918. 14,459.

INVENTOR.
William E. Elliott
By his Attorney
Nelson W. Stanton

UNITED STATES PATENT OFFICE.

WILLIAM E. ELLIOTT, OF GRAND RAPIDS, MICHIGAN, ASSIGNOR TO THE AMERICAN BUTTON & FASTENER COMPANY, A CORPORATION OF MAINE.

BUTTON FOR SHOES.

Specification of Reissued Letters Patent. Reissued Apr. 23, 1918.

14,459.

Original No. 1,209,418, dated December 19, 1916, Serial No. 72,648, filed January 17, 1916. Application for reissue filed October 1, 1917. Serial No. 194,293.

*To all whom it may concern:*

Be it known that I, WILLIAM E. ELLIOTT, a citizen of the United States, residing at Grand Rapids, in the county of Kent and State of Michigan, have invented new and useful Improvements in Buttons for Shoes, of which the following is a specification, like reference characters on the drawings indicating like parts in the several figures.

This invention relates to a button construction of especial adaptation in the manufacture of shoe buttons in which an attaching loop or shank is secured to and depends from the head of the button.

An object and purpose of my invention consists in the provision of a button having an attaching loop permanently secured thereto in such manner that the separation of the loop from the head is impossible without the destruction of the button.

I have discovered that one efficient and desirable way of effecting this permanent retention of the attaching member is to weld the same to a metallic plug disposed upon the opposite side of the button and arranged so that it cannot pass through the transverse opening in said head.

It will be evident that the conditions of use of shoe buttons, as well as many other kinds of buttons, render it very desirable that they shall be so constructed that there shall be no projections or rough edges to catch on or wear away the garment of the user or the article to which the button is attached. Important features of the invention consist in the provision of two parts, such as a plug and an attaching member, which are applied to opposite sides of the head and joined together wholly within the head. In the illustrated embodiment of the invention, those portions of these parts, which are exposed in the finished button, are completely formed prior to their application to said button.

Further objects of the invention together with novel features of construction will be apparent as understanding is had of the embodiment disclosed in the accompanying drawing, in which.

Like reference characters refer to like parts throughout the several views of the drawing.

Figure 1:
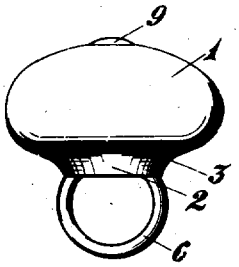
Figure 1 is a side elevation of a shoe button made in accordance with my invention.
Figure 2:
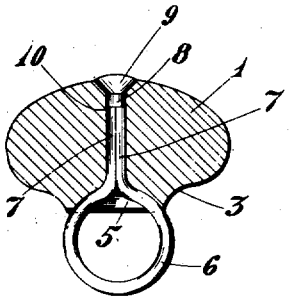
Fig. 2 is a transverse section taken through the head of the button illustrating the attachment of the loop thereto.
Figure 5:
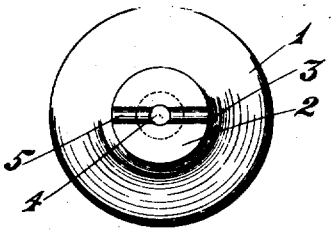
Fig. 5 is a view similar to Fig. 4 of the head of the button shown in Fig. 2.

The head 1 of the button is formed of any suitable material and on its underside is provided with a downwardly projecting portion 2 which is adapted to be received within the buttonhole when the button is in use. From the lower end of projection 2 its surface curves outwardly and upwardly as indicated at 3 joining smoothly the outer surface of the head 1, in this manner making a button head which is of especial value in the matter of protecting the stitching which faces a buttonhole. A hole 4 is bored centrally through the head 1 and the loop is formed from a piece of wire bent into a loop at 6, the ends of the wire being brought together and inserted from underneath into the opening. In the modification shown in Figs. 2 and 5 a slot is cut in the underside of the projection 2 to receive the upper parts of the loop, this slot being of such depth that when the loop is properly seated therein, the upper ends of the part 7 terminate short of the upper side of the button head 1. It will be noted that the outer surfaces of the wires of the loop continue smoothly from the surface of the part 2. A plug consisting of a lower cylindrical portion 8 integral with an upper conical portion 9 is inserted into the opening 4, the upper end thereof having been bored to receive the conical head 9, this plug at its lower end contacting at 10 with the upper end of the part 7. When so positioned the plug and the ends of wires 7 are welded together in any suitable manner, electric welding being preferably used. When the plug is thus connected to the end of the loop an exceptionally firm and sure connection of the loop to the head is provided. The ends of the loop and the plug necessarily must be pressed together and each will firmly engage against the material of the head and after the welding has been completed the shrinkage due to the cooling at the joint 10 draws the parts more firmly against the head and insures an especially tight and effective connection.

Figure 3:
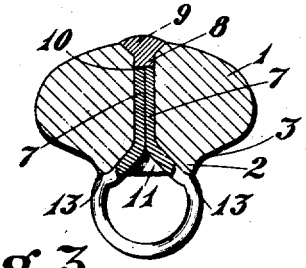
Fig. 3 is a view similar to Fig. 2 of a slight modification in detail of construction.
Figure 4:
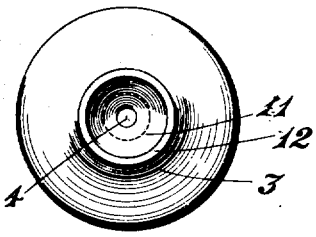
Fig. 4 is a view from beneath the button head shown in Fig. 3, previous to the attachment of the loop.

A slight modification is illustrated in Figs. 3 and 4 in which the projection 2 is counterbored to form a conical opening 11 at a distance within the outer edges of the projection 2, thereby leaving an annular shoulder 12 which will insure against any breaking or chipping off of the head which might occur if the bore 11 was carried to the extreme outer edge of the plug 2. The loop 6 is formed with a shoulder 13 at each side to seat against the annular shoulder 12 so as to make a smooth passage from the surface of the projection 2 to the outer surface of the wire of the loops. The securing of the loop in place is effected the same as previously described with reference to the construction shown in Fig. 2.

Having fully described my invention, what I claim as new and desire to secure by Letters Patent of the United States is:

1. A button comprised of a head having an opening therethrough, a loop formed of a piece of wire having the ends thereof brought together and inserted into said opening at one end, and a plug inserted into the opening at the other end connected with said ends of the loop, substantially as described.

2. A button comprised of a head having an opening therethrough, a loop formed from a piece of wire fashioned into a substantially circular loop with the ends of the wire brought together parallel to each other and inserted into one end of said opening, said circular loop being partially received within the button head, and a plug inserted into the opening at the opposite end connected with the ends of said wire, substantially as described.

3. A button comprised of a head having an opening therethrough with an enlargement thereto at each end, a piece of wire bent centrally into a substantially circular loop with the ends brought together and inserted into the opening from one end, the loop being partially received within the enlargement at said end of the opening, and a plug provided with an enlarged head inserted into the opening at the other end, said plug and ends of the wire engaging and being welded together, substantially as described.

4. A button comprised of a head having a projecting portion located centrally and on the underside of the head, the outer surface of said portions curving upwardly and outwardly and forming a continuous curved surface with the remainder of the head, said head also being bored centrally from the upper to the lower side and the opening thus formed having a conical enlargement at each end, an annular shoulder on said projecting portion bordering the conical enlargement of the opening, a piece of wire formed centrally into a curved loop, then with oppositely located shoulders adapted to position under the said annular shoulders, then bent inwardly toward each other to follow the sides of the conical enlargement, the ends of the wire then lying in parallelism and inserted in the opening from one end thereof, and a plug having a conically formed head inserted in the opposite end of the opening and seating in the conical enlargement thereof, said plug engaging with the ends of the wire and secured thereto, substantially as described.

5. A button composed of a head having an opening therethrough, a loop formed from a piece of wire having the ends thereof brought together and inserted into said opening at one end, and a plug inserted into the opening at the other end, said plug and ends of the loop being connected together within the head, substantially as described.

6. A button composed of a head having an opening therethrough, a loop formed of a piece of wire having the ends thereof brought together and inserted into said opening at one end and extending partially through the head, a plug inserted into the opening at the opposite end, and a permanent connection between the plug and the said wires of the loop, substantially as described.

7. A button comprising a head having an opening therethrough, an attaching loop having a portion which extends into one end of said opening, and a previously formed plug in the opening at the other end, said plug and loop being joined together wholly within the head.

8. A button comprising a head having an opening therethrough, an attaching loop formed with an enlarged portion and a reduced portion, the latter portion extending into said opening, and a plug having an enlarged portion and a reduced portion, the latter portion extending into said opening and being joined to said reduced portion of the loop within the head, and the exposed surface of the enlarged portion having a sectional configuration which conforms closely to the sectional configuration of the outline of the button head whereby said plug is prevented from projecting above the surface of the button.

9. A button comprising a head having a transverse opening, a metallic plug disposed at one side of said button and arranged so that it cannot pass completely through the opening, and a metallic loop similarly disposed at the other side of the button, arranged in contacting relation with and welded to said plug.

10. A button comprising a head having a transverse opening, a metallic plug arranged so that it cannot pass completely through said opening disposed on one side of the head, and a metallic loop arranged so that it cannot pass through said opening and disposed on the other side of the head, one of said metallic members projecting into the opening to contact with the other member, and being welded thereto.

In testimony whereof I have signed my name to this specification.

WILLIAM E. ELLIOTT.